DISCRIMINATING SERVICE TELEPHONE SYSTEM

Filed March 5, 1947

INVENTOR.
CLARENCE E. LOMAX
BY
ATTORNEY

Patented Oct. 21, 1952

2,615,092

UNITED STATES PATENT OFFICE 2,615,092

DISCRIMINATING SERVICE TELEPHONE SYSTEM

Clarence E. Lomax, Chicago, Ill., assignor to Automatic Electric Laboratories, Inc., Chicago, Ill., a corporation of Delaware Application March 5, 1947, Serial No. 732,418

10 Claims. (Cl. 179—6.3)

Figures 1, 2:
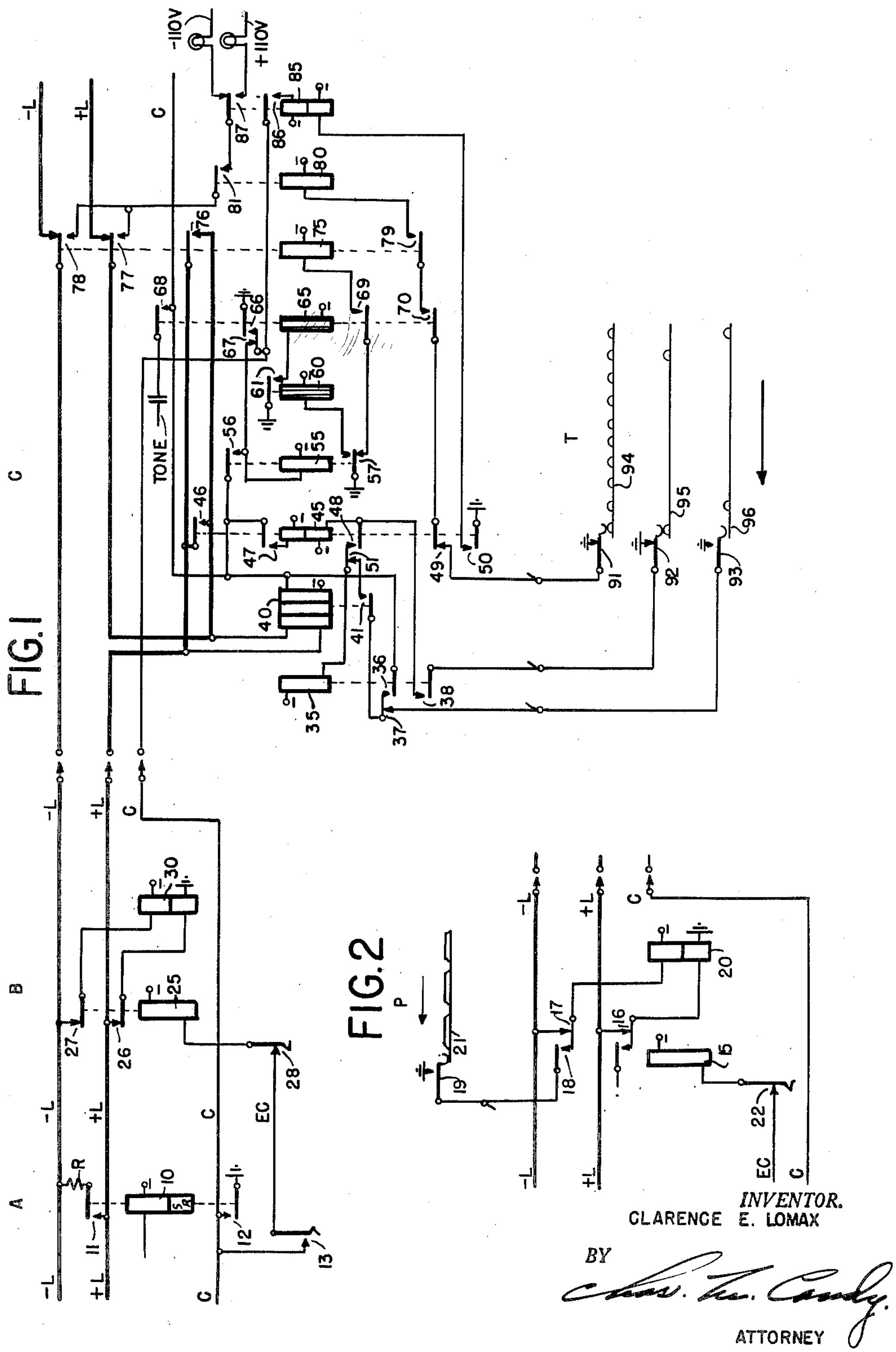

The present invention relates in general to telephone systems and in particular to mixed service telephone systems.

The principal object of the invention is the provision of an improved means for allowing one group of linefinders to serve both paystation lines and non-paystation lines.

Another object of the invention is the provision of an improved paystation control trunk.

A feature of the invention relates to an arrangement whereby a subscriber calling from a telephone which is one of a particular group of telephones is automatically switched through a control trunk before he operates his dial mechanism.

Another feature is a linefinder provided with normal post springs which operate at a predetermined position of the linefinder carriage to operate an auxiliary relay in the associated selector.

A further feature relates to a selector switch which is provided with normal post springs and an auxiliary relay which operate in combination to control the level to which the selector will step in response to the initiation of a call from a certain group of telephones.

A still further feature is the provision of an impulse sender which automatically steps a selector switch to a predetermined level if a call is originating from a paystation telephone.

Another feature is the provision of a timing mechanism common to a group of paystation control trunks which operates two relays in a trunk in timed sequence to prevent the control trunk from falsely operating thus insuring that the coins will not be collected in response to certain transient conditions such as pulsing or ring back on reverting calls.

A further feature relates to an arrangement in the control trunk which applies a supervisory signal to a control conductor.

Still another feature is the provision of a cam controlled relay in the paystation control trunk which by its operation sends repeated pulses of high voltage back to the subscriber's telephone.

Other objects and features of the invention will become apparent upon a further perusal of the specification taken in conjunction with the accompanying drawing in which:

Fig. 1 illustrates the part of an automatic telephone system which is pertinent to the present invention. A represents a linefinder circuit which is substantially the same as the one disclosed in the United States patent to Lomax et al. No. 2,214,908, September 17, 1940, but modified to include normal post springs and an extra control lead as shown. B represents a selector circuit substantially like the one disclosed in the above mentioned patent but slightly modified to include normal post springs and an auxiliary relay as shown. C is a schematic diagram of a paystation control trunk including an impulse sender T for operating two relays of the control trunk in timed sequence.

Fig. 2 is a selector like B of Fig. 1 but having an impulse sender P associated with it as an additional modification.

The operation of Strowger type finders and selectors is well known in the art hence it is thought sufficient here to give only cursory explanation of their operation and to deal more thoroughly with the embodiments of the invention which adapt standard finders and selectors for more economical use in mixed service telephone systems. Reference may be had to the above mentioned patent for a detailed explanation of the finder and selector operation.

As has been stated, one of the objects of the invention is to provide an arrangement whereby a single group of linefinders are enabled to serve both paystation lines and non-paystation lines. Since a paystation call requires special control equipment to refund or collect the coins, which equipment is not required for non-paystation calls, it is necessary that the linefinder be able to discriminate between the two types of service in order to channel all paystation calls through the control equipment. I accomplish this discrimination by the use of normal post springs on the finder shaft and by connecting all paystation lines to the upper finder level or levels depending upon the number of paystation lines to be served.

Referring now to Fig. 1, when a subscriber initiates a call from a paystation telephone, he completes a circuit to the start relay 10 in a well known manner. Relay 10 is similar to relay R140 in Fig. 1 of the above mentioned patent. Relay 10 thus energized bridges the resistance R across the speaking leads —L and +L at contacts 11 which causes the pulsing relay 30 of the associated selector to be energized in a manner hereinafter described. Relay 10 also connects ground to the C conductor at contact 12. The finder now operates in a well known manner to hunt in a vertical direction for the level to which the calling line is connected. When the finder reaches the first level to which paystation lines are connected it will close its normal post springs 13 to connect ground from the C conductor to an extra control lead EC. This ground on the EC lead will cause the energization of relay 25 the operation of which will be hereinafter described. The calling line may be connected to this first paystation level in which case the linefinder will commence hunting in a rotary direction for the calling line, or it may be connected to a higher level in the group of paystation levels in which case the finder will continue in the vertical direction until it reaches the level to which the calling line is connected whereupon it will commence its rotary hunting. When the linefinder finds the calling line, it connects the calling subscriber's line circuit through to the associated selector which in this case is represented by B.

Relay 30 is a pulsing relay substantially the same as R260 in Fig. 2 of the patent of reference. As soon as relay 10 operates, relay 30 will be energized over the following circuit, from battery, upper winding of relay 30, contact 27, resistance R, contacts 11, and 26, and lower winding of relay 30 to ground. Relay 30 performs well known functions one of which is to prepare a circuit to a vertical magnet which will energize to step the selector one vertical step at each subsequent deenergization of relay 30. Relay 25 will operate over an obvious circuit when the finder reaches the first level to which paystation lines are connected and closes its normal post springs 13. Relay 25 thus energized opens the energizing circuit of relay 30 at contacts 26 and 27. Relay 30 in restoring closes a circuit to the vertical magnet which operates and steps the selector one vertical step. The selector is also provided with normal post springs 28 which open when the selector reaches the first level. The operation of the normal post springs 28 opens the energizing circuit of relay 25. Relay 25 restores and closes the energizing circuit of relay 30 at contacts 26 and 27. The first level of the selector has paystation control trunks connected to its bank contacts and the selector now hunts in a rotary direction for an idle one of these control trunks. When it finds an idle trunk it switches the speaking leads —L and +L and the C conductor through to the idle control trunk by the operation of a relay (not shown) like R210 of the patent of reference. Thus we see that the selector is automatically stepped to its first level in response to a call originating from a paystation telephone before the calling subscriber operates his dial mechanism.

Fig. 2 shows an arrangement similar to the selector B of Fig. 1 but with the addition of an impulse sender P which is a constantly rotating cam, driven by any suitable means and which may be common to a group of selectors. Relays 20 and 15 are similar to relays 30 and 25 respectively of Fig. 1. The finder A of Fig. 1 will now be thought of as being associated with the selector of Fig. 2. As soon as relay 10 of Fig. 1 operates, relay 20 will operate over the following circuit, from battery, upper winding of relay 20, contact 17, —L conductor, resistance R, contact 11, +L conductor, contact 16, and lower winding of relay 20 to ground. The operation of relay 20 causes the same subsequent operations in the selector as did the operation of relay 30. It is thought sufficient in explaining the present invention to say that the subsequent operations of relay 20 will cause a vertical magnet to be energized which will step the selector one step in a vertical direction for each deenergization of relay 20. Relay 15 will operate over an obvious circuit when the finder reaches the first level in which paystation lines are connected to its bank contacts at which time the finder will close its normal post springs 13. Relay 15 thus energized opens the original energizing circuit of relay 20 at contacts 16 and 17 and prepares a new energizing circuit for the upper winding of relay 20 at contact 18. Relay 20 will now be under the control of the impulse sender P and since the pulsing circuit is so short, satisfactory pulsing will be obtained by using only one winding of relay 20. If the impulse sender P, is in the position shown at the instant relay 15 operates and opens its contacts 16 and 17, relay 20 will restore and cause the selector to take one vertical step. If cam 21 happens to be operating its spring contact 19 at the instant relay 15 operates, relay 20 will hold momentarily on its upper winding over the following circuit; from ground, spring contact 19, make before break contact 18, and upper winding of relay 20 to battery. Relay 20 will alternately operate and restore as the cam mechanism P moves under the spring contact 19 thus causing the selector to take a vertical step every time relay 20 restores. The selector will continue to step in a vertical direction until it operates its normal post springs 22 at a predetermined level in which paystation control trunks, such as C in Fig. 1, are connected to the bank contacts. In operating its normal post springs 22, the selector opens the energizing circuit of relay 15 at contact 22. Relay 15 in restoring closes the original energizing circuit of relay 20 which now holds over this circuit. The selector now hunts in a rotary direction for an idle control trunk and by the operation of a relay (not shown) similar to R210 of the patent of reference, switches the —L, +L, and C leads through to the idle control trunk when it has been found.

Consider now the operation of this system when a subscriber calling from a non-paystation telephone initiates a call. The operation of the finder A is as hereinbefore described except that in this case the finder level to which the calling line is connected will be lower than the lowest level to which paystation lines are connected hence the finder will never operate its normal post springs such as 13. If the normal post springs of the finder are not operated, auxiliary relay 25, or 15 of Fig. 2, will not operate and the selector will operate in a well known manner under the control of the subscriber's dial mechanism to extend a connection through various trunks and automatic switches to the desired telephone. It is evident that the number one has no utility for use as the first digit of a telephone number in an exchange using the selector of Fig. 1 since this would put a non-paystation subscriber through a paystation control trunk on the first digit. By the same token an exchange using the selector of Fig. 2 would have a restricted first digit depending upon the selector level at which the selector normal post springs 22 are set to operate.

Referring now to C of Fig. 1 and assuming that a subscriber has initiated a call from a paystation telephone and that the finder and selector (of either Figs. 1 or 2) have operated as has been described to switch the calling subscriber's line through to a paystation control trunk such as C, which is disclosed in Fig. 1. Relay 40 is an electropolarized relay having one winding in series with a speaking lead and the other winding connected between battery and ground which is returned over the right hand portion of conductor C from the following selector which is permanently associated with the control trunk. Relay 40 will not operate under this condition as its windings are energized in opposition but it will operate should the current through the speaking leads be reversed. Relay 55 operates, when the trunk is seized, over the following circuit; from battery, winding of relay 55, contact 67 to the left hand portion of conductor C to ground which is connected at the selector of either Fig. 1 or 2. Relay 55 thus energized closes an obvious locking circuit for itself to the right hand portion of conductor C at contact 56, and completes an obvious circuit for relay 60 at the make contacts of armature 57. Relay 60 operates and completes an obvious circuit for relay 65 at contact 61. Relay 65 operates and connects an auxiliary ground to the left hand portion of conductor C at contact 66, opens the original energizing circuit of relay 55 at contact 67, connects a supervisory tone to the right hand portion of conductor C at contact 68, prepares a circuit for relay 75 at contact 69, and closes a point in the circuit of relay 80 at contact 70. The supervisory tone applied to the C conductor may be used to inform the operator, if the subscriber is calling an operator, that the call is originating from a paystation telephone so that she may perform the necessary functions to refund the coins to the subscriber. The calling subscriber now calls the desired party in a well known manner by operating his dial mechanism which will operate a selector switch having access to the same trunks as does the selector B and which may be similar to the selector disclosed in the patent of reference. While the control trunk is described as working into a selector switch, it should be understood that the control trunk could work into any one of a number of various trunks or switches such as, for instance, a reverting call switch or simply an operator's position. Two conditions may now control the future operation of the paystation trunk. (1) The called party answers the call and a conversation takes place. (2) The called party fails to answer and the calling party hangs up.

Assuming now that the first condition is effective. The current flowing through leads −L, +L, and the left hand winding of relay 40 is made to reverse direction by the action of the called party when he answers the call. This so called reverse battery feature is well known in the art. Since the windings of relay 40 are now energized in an aiding direction relay 40 operates and prepares a circuit for relay 35 at contact 41. The operation of relay 35 is now under the control of the impulse sender T which is a constantly rotating cam mechanism driven by any suitable means and which may be common to a group of paystation control trunks. Relay 35 operates over the following circuit when cam 96 operates its spring contact 93; from battery, winding of relay 35, contacts 51, 41, 37 and spring contact 93 to ground. Relay 35 thus energized prepares a circuit for relay 45 at contact 38, opens its original energizing circuit at contact 37, and at make before break contact 36 completes a locking circuit for itself as follows; from battery, winding of relay 35, contacts 51, 41, and 36 to the grounded right hand portion of conductor C. The cam mechanism T must now make nearly a complete revolution before cam 95 operates its spring contact 92 at which time the lower winding of relay 45 is energized over the following circuit; from battery, lower winding of relay 45, contact 38, and spring contact 92 to ground. The delay in time between the operation of relays 35 and 45 which is determined by the construction of T and its speed of rotation, is such as to prevent both relays 35 and 45 from operating should relay 40 be momentarily operated as the result of certain transient conditions such as pulsing or ring back on reverting calls. Relay 45 thus energized short circuits the left hand winding of relay 40 at contact 46, locks its upper winding to the grounded right hand portion of conductor C at contact 47, completes an obvious circuit to the lower winding of relay 85 at contact 50, opens a point in the circuit of relay 80 at contact 49, opens the original holding circuit of relay 35 at contact 51, but at make before break contact 48 completes a momentary holding circuit for relay 35 as follows; from battery, winding of relay 35, contacts 48, 38 and spring contact 92 to ground. Thus it is seen that the deenergization of relay 35 is given a momentary delay equal to the time that spring contact 92 is operated by cam 95. This momentary delay in the deenergization of relay 35 is to insure that relay 45 locks up over its upper winding before relay 35 opens the energizing circuit of the lower winding at contact 38. Relay 85, in operating, completes an obvious locking circuit to its upper winding at contact 86, and closes a point in a coin collect circuit at contact 87.

No further changes take place until the conversation has been completed and either the calling or the called party releases all switches in the switch train from the paystation control trunk to the called party's line by releasing his line circuit. This release is accomplished by removing ground from the right hand portion of conductor C in a well known manner. The switches between the paystation control trunk and the calling party's line are held up by the ground applied to the left hand portion of conductor C at contact 66. In response to the removal of ground from the right hand portion of conductor C, relays 45 and 55 will restore. Relay 45 in restoring removes the short circuit from the left hand winding of relay 40 at contact 46, closes a point in the energizing circuit of relay 80 at contact 49, and at contact 50 opens the original energizing circuit of relay 85. In restoring, relay 55 opens a point in its locking circuit at contact 56, opens the energizing circuit of relay 60 at the make contact of armature 57 and completes an obvious circuit for relay 75 at the break contact of armature 57. Relay 60 is a slow to release relay and when it does release it merely opens the energizing circuit to slow to release relay 65 at contact 61. We now have a time interval equal to the restoring time of the two slow to release relays 60 and 65 to collect the coins at the paystation by the action of relay 80. Relay 75 now operates over the following circuit; from ground, break contacts of armatures 57, 69, and winding of relay 75 to battery. Relay 75 thus energized short circuits the speaking leads −L and +L at contacts 77 and 78, short circuits the left hand winding of relay 40 at contact 76, and closes a further point in the energizing circuit for relay 80 at contact 79. Relay 80 now operates over an obvious circuit every time cam 94 operates its spring contact 91. Every momentary operation of relay 80 puts positive 110 volts from contact 87 through contact 81 onto the short circuited speaking leads −L and +L at contacts 77 and 78. The positive potential of 110 volts on both speaking leads operates a coin mechanism such as is disclosed in Fig. 1 of the United States patent to Lomax No. 2,226,731, December 31, 1940, to collect the coins at the paystation telephone. It will be noted that this coin mechanism has its magnet insulated from the line by a glow discharge device in the form of a neon tube. This insulation is necessary to keep ground from the speaking leads so that the pulsing relays 30, or 20, will operate satisfactorily. Relay 80 will continue to pulse under the control of cam 94 until slow to release relay 65 restores at which time relay 65 opens the energizing circuit of relay 75 at contact 69, opens the energizing circuit of relay 80 at contact 70, and at contact 66 removes ground from the left hand portion of conductor C which in turn releases the preceding switch train. All relays in the paystation control trunk have now restored and the system is ready to receive another call.

Assuming now that the second condition is effective, namely that the called party fails to answer the call and the calling party hangs up. Relay 40, and consequently relays 35 and 45, cannot operate under this condition in response to reverse battery as that is had only when the called party answer the call. Relays 35 and 45 are prevented from both operating by the delay in the sequence of their operation, which is imparted to them by the cam mechanism T, even should relay 40 operate due to some transient condition such as pulsing or ring back on reverting calls. Relays 55, 60, and 65 are in an operated position as has been hereinbefore described. When the calling subscriber opens his subscriber's loop circuit he releases all switches in the switch train except the switches between the calling subscriber's line and the paystation control trunk which are held up by the ground applied to the left hand portion of conductor C at contact 66. The restoring of the switch train following the paystation control trunk causes ground to be removed from the right hand portion of conductor C hence the locking circuit for relay 55 is opened and it restores. Relay 55 in restoring opens the energizing circuit of slow to release relay 60 at the make contacts of armature 57 and at the break contacts of armature 57 completes an obvious circuit to relay 75 which now operates. As was the case under the first condition we now have a time interval equal to the restoring time of the two slow to release relays 60 and 65 in which to operate the coin mechanism at the paystation telephone. Relay 75 in operating short circuits the speaking leads −L and +L at contacts 77 and 78, short circuits the left hand winding of relay 40 at contact 76 and closes a point in the energizing circuit of relay 80 at contact 79. Relay 80 now operates under the control of cam 94 in the same manner as it did under the first condition. Under the present condition relay 45 never operates hence relay 85 cannot operate. Relay 85 being held inoperative causes relay 80 to put negative 110 volts from contact 87 through contact 81 onto the short circuited speaking leads −L and +L. The negative potential of 110 volts on both sides of the subscriber's line causes the aforementioned coin mechanism to refund the coins to the calling subscriber since his call was not completed. Relay 80, as before, puts several pulses of high voltage on the speaking leads to insure that the coin mechanism refunds the coins. Slow to release relay 65 will soon restore and perform the same functions as it did under the first condition to prepare the system for another call.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In a telephone system, a linefinder switch having normal post springs thereon, a selector switch, means in said selector switch for stepping said selector switch to a predetermined level in response to the operation of said normal post springs.

2. In a telephone system, a particular group of subscribers' lines, a linefinder having normal post springs thereon, a selector switch also provided with normal post springs and a relay, an impulse sender associated with said selector, said finder post springs operated only when a call originates from one of said lines; said relay, impulse sender, and selector post springs all operating in conjunction with each other to step said selector to a predetermined level in response to the operation of said finder post springs.

3. In a telephone system, a linefinder switch having normal post springs thereon, a selector switch, said finder switch having the lines of a particular group of telephones connected to its uppermost levels, said normal post springs operated when the linefinder reaches the lowest of said levels while hunting for a calling one of said lines, means in said selector responsive to the operation of said post springs for operating said selector to step to a predetermined level.

4. In a telephone system, a linefinder switch having normal post springs thereon, an auxiliary relay operated only in response to the operation of said normal post springs, and a selector switch automatically stepped in response to the operation of said relay.

5. In a telephone system having calling and called lines, a linefinder switch having normal post springs thereon, a selector switch also provided with normal post springs, said selector switch having an auxiliary relay and a plurality of levels accessible thereto, an impulse sender associated with said selector, said finder post springs operated only when a call is originated from a particular group of said lines, said relay operated only when said finder post springs operate to render said impulse sender operative to step said selector, the level at which said selector stops being under the control of said selector post springs.

6. In a telephone system having calling and called lines, means for establishing a talking connection therebetween, a trunk circuit included in said connection only when the call originates from a particular group of said calling lines, a relay in said trunk circuit operated upon response of the called party, a pair of control relays, a third relay, an impulse sender operating to operate said control relays in timed relation after the operation of said first relay, and means controlled only after the operation of both of said control relays for operating said third relay to perform coin control functions.

7. In a telephone system having calling and called lines arranged in groups, means for establishing connections therebetween, a control conductor, a linefinder switch included in each of said connections, a trunk circuit normally excluded from certain of said connections, normal post springs in said finder operated only when a call is initiated from one of a particular group of said lines, means for including said trunk circuit in a connection only upon the operation of said post springs, and means in said trunk circuit for connecting a supervisory signal to said control conductor to indicate the origin of the call.

8. In a telephone system, lines of different character, a group of automatic switches, certain other automatic switches, a group of trunk lines accessible to all of said switches, certain of said trunk lines terminating in said certain other switches, means responsive to the initiation of a call from any of said lines for seizing one of said switches of said group, and means for automatically operating said seized switch to automatically seize one of said certain trunk lines leading to one of said certain switches or for directively operating said seized switch by the impulses of a first digit to seize one of the remaining trunk lines of said group dependent upon the character of the calling line connected thereto, said seized switch automatically operated only in case the calling line is of a particular character, and said seized switch only directively operated by impulses in case the calling line is of a different character.

9. In a telephone system having paystation and non-paystation lines, a finder-selector link accessible to any of said lines, a control trunk, means in said finder of said link operated responsive to the initiation of a call from any one of said lines for automatically connecting said finder with said calling line, first discriminating means also included in said finder operated only in case said finder connects with a calling paystation line, and means including other discriminating means in said selector of said link controlled responsive to said operation of said first discriminating means for automatically operating said selector to connect said calling paystation line with said control trunk prior to dialling of the desired call number.

10. In a telephone system having calling and called paystation and non-paystation lines, a finder-selector link having access to any of said lines for establishing a talking connection therebetween, said finder of said link having the lines of said paystations connected to certain ones of its levels and the lines of said non-paystations connected to the remaining ones of its levels, a control trunk, said selector of said link having said control trunk connected to a predetermined one of its levels, means in said finder of said link operated responsive to the initiation of a call from any one of said lines for automatically connecting said finder with said calling line, normal post springs in said finder operated only in case said finder connects with said certain levels having said paystation lines connected thereto, and means including discriminating means in said selector of said link controlled responsive to said operation of said normal post springs for automatically operating said selector to step to said predetermined level, whereby said calling paystation line is connected to said control trunk prior to dialling of the desired call number.

CLARENCE E. LOMAX.

REFERENCES CITED

The following references are of record in the file of this patent:

UNITED STATES PATENTS

| Number | Name | Date |
|---|---|---|
| 1,934,402 | Brandt | Nov. 7, 1933 |
| 1,963,929 | Baker | June 19, 1934 |
| 2,214,908 | Lomax | Sept. 17, 1940 |
| 2,217,041 | Boswau | Oct. 8, 1940 |
| 2,276,731 | Lomax | Dec. 31, 1940 |
| 2,367,769 | Goddard | Jan. 23, 1945 |
| 2,374,964 | Walsh | May 1, 1945 |
| 2,385,720 | Molnar | Sept. 24, 1945 |
| 2,427,000 | Houland | Sept. 9, 1947 |
| 2,471,087 | Anderson | May 24, 1949 |